ELECTRICAL PANEL AND TERMINAL CIRCUIT HARNESS THEREFOR

Filed July 23, 1959 3 Sheets-Sheet 1

INVENTORS
KEMPER M. HAMMELL
AND HERMAN RUEGER
BY
Curtis, Morris & Safford

INVENTORS
KEMPER M. HAMMELL
AND HERMAN RUEGER
BY
Curtis, Morris & Safford

ELECTRICAL PANEL AND TERMINAL CIRCUIT HARNESS THEREFOR

Filed July 23, 1959 3 Sheets-Sheet 3

INVENTORS
KEMPER M. HAMMELL
AND HERMAN RUEGER
BY
Curtis, Morris + Safford 3,068,376
Patented Dec. 11, 1962

3,068,376

ELECTRICAL PANEL AND TERMINAL CIRCUIT HARNESS THEREFOR

Kemper M. Hammell, Harrisburg, and Herman Rueger, Lancaster, Pa., assignors to AMP Incorporated, Harrisburg, Pa.

Filed July 23, 1959, Ser. No. 828,971
5 Claims. (Cl. 313—108)

The present invention relates to a circuit harness for connection to an electrical panel or panel-board of the type, such as used for electro-luminescence, general lighting purposes, heating purposes, and otherwise. Panels of this type are becoming widely used for such purposes and such panels readily may be mounted in room walls or ceilings, supported by suitable channel members or otherwise, as desired. The use of such panels obviously is not restricted to use in walls or ceilings in rooms, however, inasmuch as they readily may be employed in association with means other than walls and ceilings of rooms, and any appropriate supporting means may be used to hold the panels in desired operative positions.

Panels of this type may comprise frames molded from synthetic resin, commonly referred to as "plastic," or the like, such frames comprising channel formations outlining an opening of substantial size, said opening being covered by a sheet of material such as glass, synthetic resin, or metal, to which is affixed a carrier layer of material capable of emitting energy in a desired form when a current is impressed thereon. For luminescing purposes, a layer of synthetic material is used having finely divided phosphorous-like material dispersed therein which is subjected to an electric field in use. For purposes of imposing an electric field upon or through such carrier layer, a film or layer of current conducting material, either metallic or chemical salts, or the like, is applied to the opposite surface of the carrier layer from that engaging the supporting glass sheet, for example. A second film or layer of such current conducting material likewise must be applied to the opposite surface of said carrier layer and it is necessary to provide appropriate bus bars respectively affixed to said current conducting films or layers, whereby said bus bars may be connected to suitable electric circuit leads, in order that current from a suitable source of a line supply may be directed to and from said current conducting films or layers.

It also is possible to utilize metallic sheets as the supporting means for the carrier layer of impregnated material capable of luminescing. Under such circumstances, the metallic sheets, such as aluminum or steel, may have the carrier layer of impregnated material applied directly thereto, whereby said supporting metallic sheets comprise one current conducting layer or lamina to which current may be applied for imposing the current upon or through the impregnated carrier layer. Under such circumstances, it is necessary to apply only one additional film or layer of current conducting material, such as a film of aluminum or layer of chemical material such as tin oxide or chloride to the opposite surface of the carrier layer. Under such circumstances, it is necessary to apply a bus bar to the last-mentioned conducting film or layer and the metallic supporting sheet may be grounded to complete the circuit when a current is to be imposed upon or through the impregnated carrier layer.

Where a composite panel is formed utilizing a metallic supporting sheet such as just described, it is customary to apply a protecting, transparent layer of epoxy resin, suitable lacquer, glass or the like over the thin conducting film or layer applied to the opposite surface of the carrier layer from that engaging the metallic supporting sheet. Hence, particularly when the impregnated layer is to be used for illuminating purposes, and the particles with which said layer is impregnated are excited by the current imposed upon or through said carrier layer, the luminescence thereof will be visible through the transparent covering layer.

Where a number of panels of the composite types, described in general hereinabove, are to be used in adjoining relationship, it is advantageous to provide circuit means thereon and arrange the same so that the circuits respectively may be interconnected to each other, as well as to a source of the line current to be supplied to the composite panels. Accordingly, it is the principal purpose of the present invention to provide circuit harness means which may be affixed, preferably permanently, to each panel of the type described, said harness primarily comprising current supply members which are interconnectable either with leads to and from line conductors, or to each other as when applied to a plurality of panels and said panels are placed in substantially abutting relationship with each other. By arranging the panels so as to be connectable and disconnectable readily to and from each other, wide versatility of the use of such panels is provided, particularly in regard to the circuit means used to supply electric current to said panels.

Another object of the invention is to provide circuit harness means for panels of the type referred to in which interfitting circuit connector means are affixed respectively to opposite ends of a circuit conductor which is of sufficient length to extend from one end to the other of a panel to which the harness is to be connected, said connectors respectively being enclosed within similar insulating housings or shielding enclosures having interior openings or passages arranged to receive the electrical connectors of the harness slidably, said connectors and insulating housings being provided with inter-engaging means to prevent relative longitudinal movement in either direction between the connectors and housings after the connectors have been fully inserted into said housings.

A further object of the invention is to provide the electrical conductor of the harness means respectively with male and female terminal connectors at opposite ends, said terminal connectors having means respectively engaging means within the insulating housings to suitably position the male and female terminal connectors within said housing so that when said housings are connected to panels by which they are to be supported, said male and female terminal connectors will be aligned respectively for connection with the corresponding terminal connectors of an adjacent panel which is to be connected in circuit with the first-mentioned panel.

Still another object of the invention is to provide interfitting means on the insulating terminal housings and the frames of the panels to position such housings against transverse or longitudinal movement relative to the frames of the panels after the final layer of resin is applied to a composite panel; for example, such as a layer of epoxy resin, such layer of resin serving to firmly secure the insulating housings to the panel.

Still another object of the invention is to provide said harness with lead wires or conductors, one end of which is connected to one of the terminal connectors of the harness, while the opposite end is provided with a suitable tab for connection by soldering or otherwise to a bus bar affixed to one of the conducting layers of the composite panel.

One further object of the invention is to provide suitable disconnection means which preferably may be operated by simple tool means such as a screw driver to effect ready and fool-proof separation of panels from each other when the same are to be disconnected, such as for replacement or the like.

Still another object of the invention is to provide suitable insulating and positioning supports for the conductor of the circuit harness between the terminal connectors thereof, said insulating means being secured to the panel preferably by the final layer of transparent coating resin, for example, whereby such insulated supports prevent sagging or separation of the conductor from the panel, either accidentally or otherwise.

Details of the foregoing objects and of the invention, as well as other objects thereof, are set forth in the following specification and illustrated in the accompanying drawings comprising a part thereof.

Figure 2:
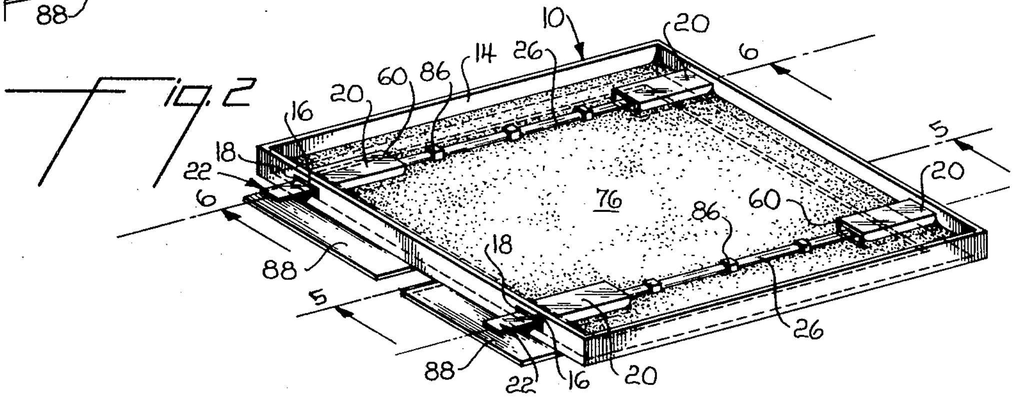
FIGURE 2 is a perspective view illustrating the upper surface of a panel board of the type shown in FIGURE 1, said board being on a slightly larger scale than that employed in FIGURE 1.
Figure 3:
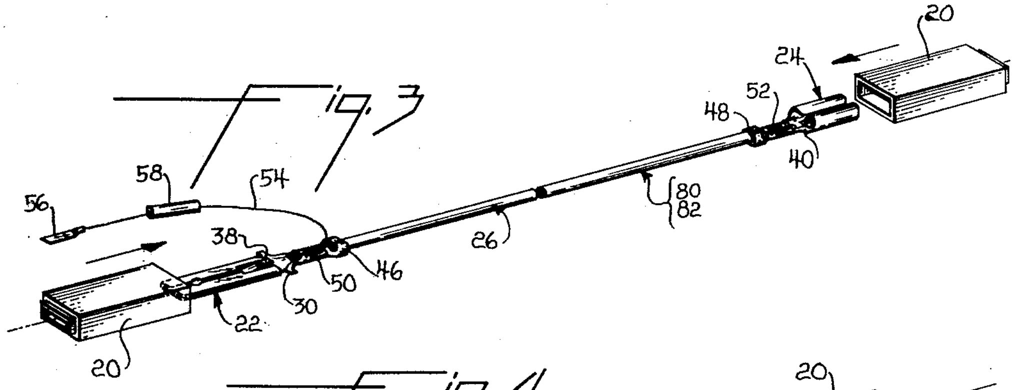
FIGURE 3 is a perspective view, broken in the middle to foreshorten the same, illustrating an exemplary circuit harness embodying the principles of the present invention, the insulating housings being illustrated in said view in process of receiving the electrical connectors on opposite ends of the conductor of the harness.
Figure 4:
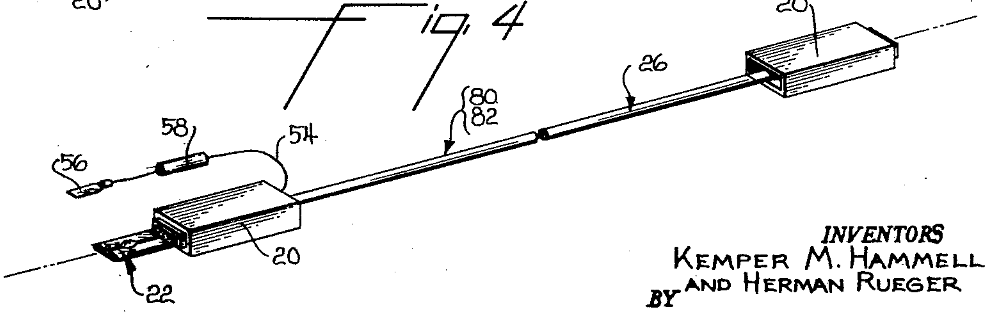
FIGURE 4 is a view similar to FIGURE 3 but illustrating the insulating housings applied fully to the electrical connectors at opposite ends of the harness.
Figures 5, 6, 7, 8:
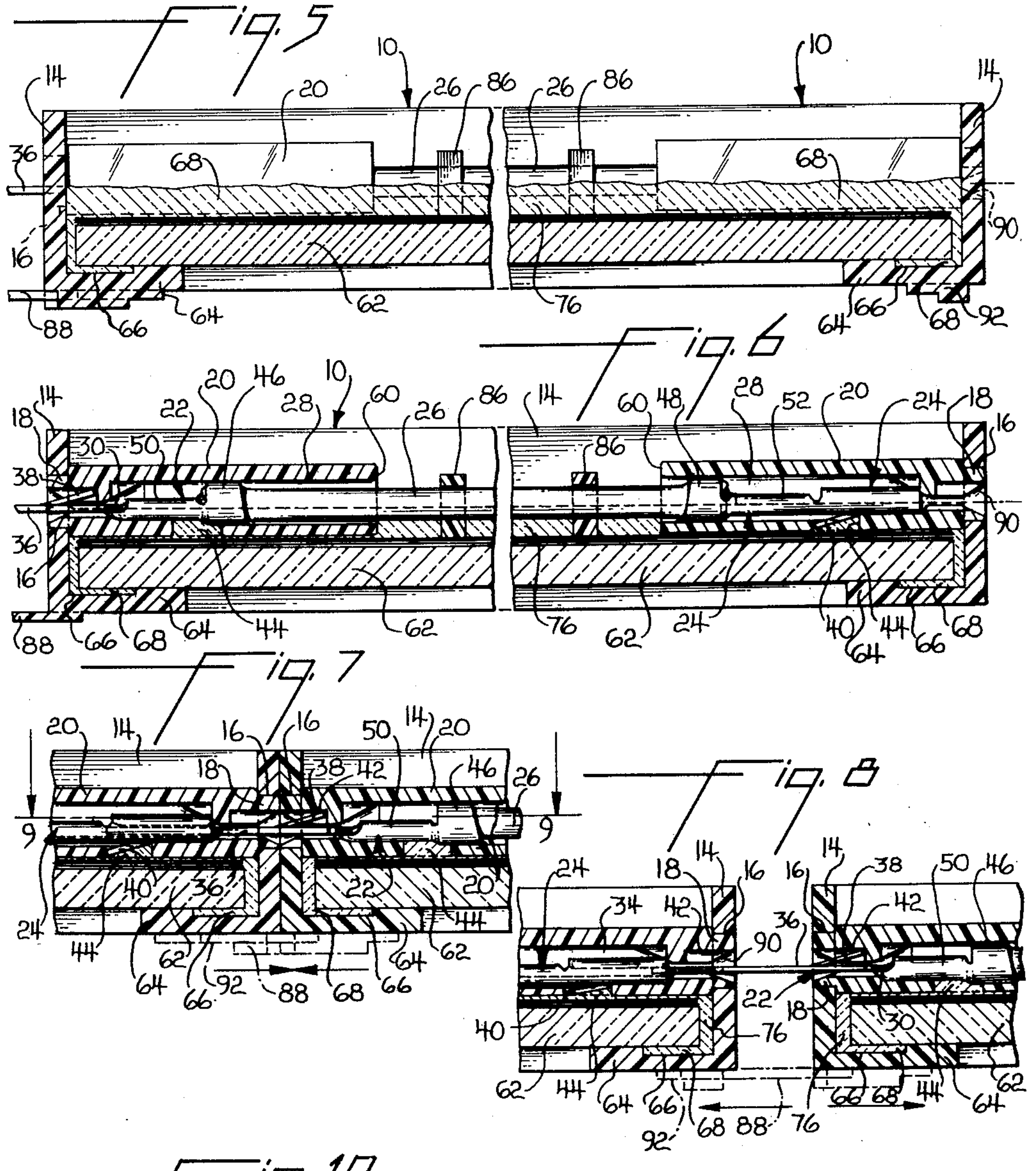
FIGURE 5 is a vertical sectional view taken on the line 5—5 of FIGURE 2 and employing a larger scale than used in FIGURE 2, said figure also being broken in the middle to foreshorten the view.
FIGURE 6 is a view similar to FIGURE 5 but taken on the line 6—6 of FIGURE 2.
FIGURE 7 is a fragmentary vertical sectional view similar to the opposite ends of the panel board and circuit harness shown in FIGURE 6, but illustrating the opposite ends of two similar panel boards in connected relationship with each other.
FIGURE 8 is a view similar to FIGURE 7 but showing the fragmentary portions of two similar panel boards being slightly separated from each other as during the course of exchanging one panel board for another.
Figure 12:
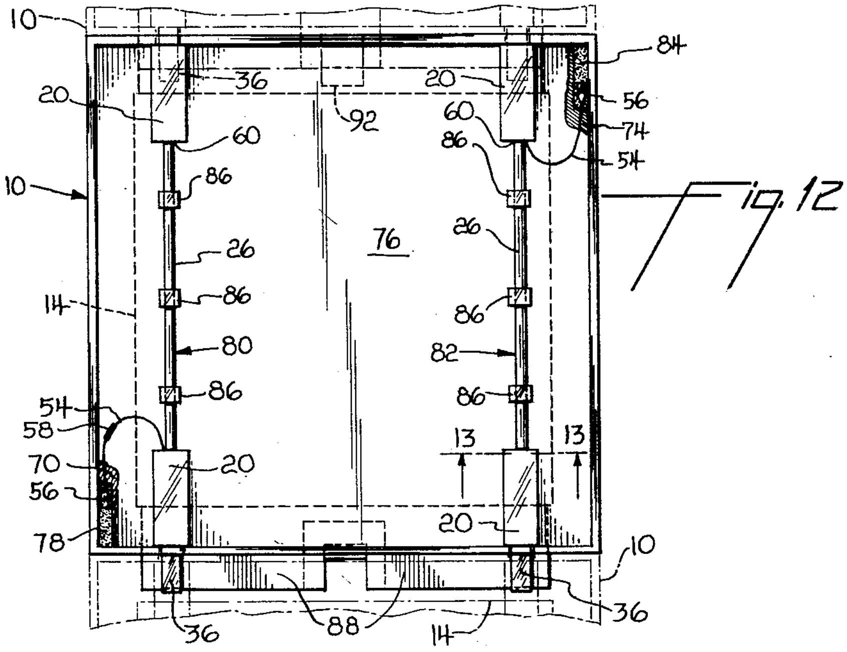

FIGURE 12 is a plan view of the composite panel similar to that shown in FIGURE 2 and illustrating opposite ends of said panel interconnected to fragmentarily illustrated ends of similar panels, the latter being shown in phantom and the current conducting means of the panel being different from that illustrated in the preceding figures, whereby each of the harnesses require a lead to bus bars respectively connected to different conductive layers of the composite panel.

Figure 13:
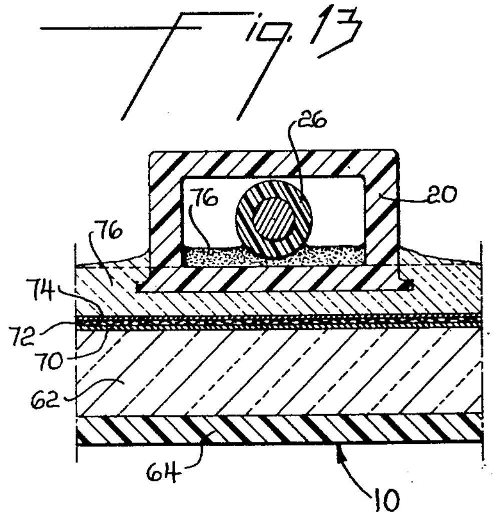

FIGURE 13 is a transverse sectional view taken on the line 13—13 of FIGURE 12 and shown on a substantially larger scale than that employed for FIGURE 12.

Figure 1:
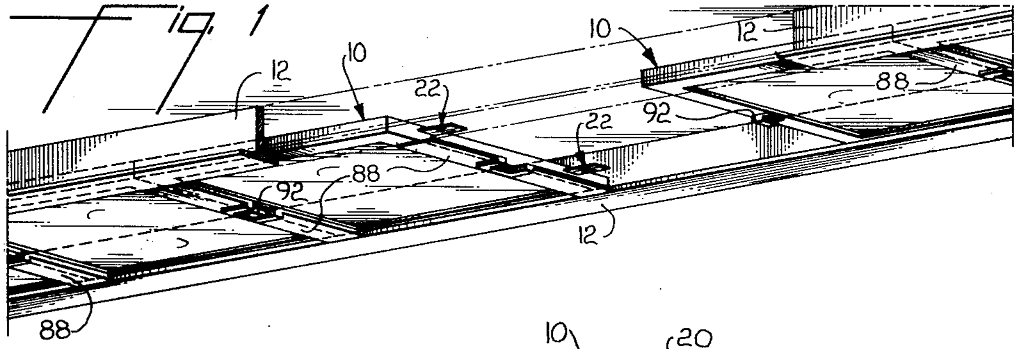
FIGURE 1 is an exemplary fragmentary perspective view illustrating a plurality of electric panel boards supported by suitable channel members, as in a ceiling installation, said view illustrating one of such panel boards in process of being connected to a group or row of other similar connected panel boards.

There is illustrated in FIGURE 1 an exemplary installation of a plurality of panel boards 10, which will be assumed to be similar and preferably interchangeable with each other so as readily to be replaceable. For example, if the exemplary installation shown in FIGURE 1 is in a ceiling, a plurality of T-bars 12 may be mounted upon suitable stringers in a ceiling and the vertical webs thereof are spaced apart sufficiently to accommodate respectively the opposite edges of the panel boards 10 which rest upon the horizontal head flanges of the T-bars 12 as clearly shown in FIGURE 1. Under such circumstances, the panel boards 10 readily may be moved slidably, longitudinally along the spaced T-bars 12, especially for purposes of connecting opposite ends of the panel boards 10 with each other, by means to be described.

Although the panel boards 10 may be made in a number of different ways basically, one typical basic construction is illustrated in the drawings and described hereinafter, it being understood that the circuit harness and combination thereof with a panel board and embodying the principle of the present invention is not to be restricted to the specific illustration in the drawings illustrating the specification. Accordingly, in the specifically illustrated panel boards 10, the same comprise a generally rectangular frame 14, the sides of which are substantially L-shaped in cross-section as best shown in FIGURES 5 through 8. Pairs of opposite sides of the frames 14 which are to be arranged in abutting relationship with similar ends of adjacent panel boards, for example, are provided with slot-like openings 16 for purposes of slidably and preferably snugly receiving reduced ends 18 on molded housings 20.

The housings 20 may be molded from any suitable synthetic resin or other appropriate material of a preferably stiff nature which is preferably as resistant to cold flow as possible in order to be shape-retaining to prevent relative movement of male connectors 22 and female connectors 24 respectively connected to opposite ends of an electrical conductor 26 such as an insulated wire, either braided or solid. The molded housings 20 preferably are unitary and are provided with an interior opening 28 extending longitudinally thereof for the entire length of the housings. The opening 28 is preferably constructed to receive selectively either the male electrical connector 22 or the female electrical connector 24 and position the same therein with equal facility against relative longitudinal movement in either direction by means to be described. This is one of the very advantageous features of the present invention.

Figure 9:
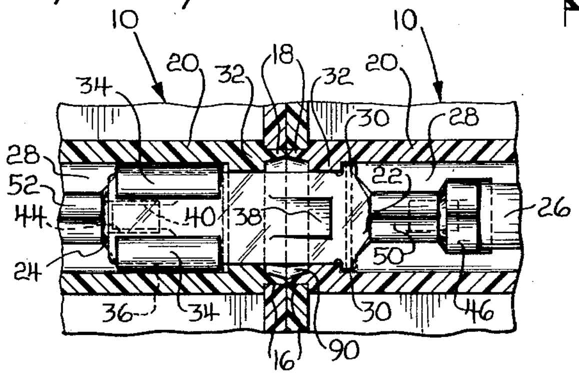
FIGURE 9 is a fragmentary horizontal sectional view taken on the line 9—9 of FIGURE 7 and illustrating positioning means upon the insulating housings and terminal connectors of the circuit harness respectively applied to two adjacent panel boards.

By referring particularly to FIGURE 9, it will be seen that the male connector 22 is provided with a pair of ears 30 respectively extending laterally in opposite directions from the longitudinal axis of the connector, said ears respectively abutting the inner surfaces of end wall 32 of each housing 20, while a pair of socket-forming curled wings 34 of the female connector 24, which slidably clamp against one surface of the axially extending tab 36 of the male connector 22, abut at the innermost ends thereof against the inner wall of end wall 32 of the housings 20, as clearly shown in FIGURE 9. Hence, the engagement of ears 30 of the male connectors 22 and the innermost ends of curled wings 34 of the female connector 24 respectively abut the inner surfaces of the end walls 32 of the housings 20 to prevent movement of said connectors toward each other.

Relative movement between the connectors 22 and 24 and the housings 20 containing the same in withdrawal direction, opposite to the directions referred to above, are prevented respectively by flexible tongues 38 and 40 respectively struck from the male and female connectors 22 and 24 for reception within locking recesses or holes 42 and 44.

The male connector 22 is provided with a pair of crimping ears 46 and the female connector 24 is provided with a pair of crimping ears 48, which pairs of crimping ears respectively engage the insulation of the electrical conductor 26. Additional pairs of crimping ears 50 and 52 respectively are provided on the male connector 22 and female connector 24 for engagement with the metallic wire portion of the electrical conductor 26, for example, at opposite ends of said conductor of each of the circuit harness assemblies. Said assemblies comprise conductor 26, male and female connectors 22 and 24 affixed to opposite ends thereof, shielding housings 20 affixed respectively to said male and female connectors, and an insulated lead wire 54 having a preferably small terminal 56 connected to the outer end thereof, while the opposite end is connected electrically to the metallic wire portion of the conductor 26 by crimping ears 50. Preferably, one of the lead wires 54 on each panel has a resistor 58 of suitable capacity connected therein to prevent overloading of the panel board, such resistors acting similarly to a safety fuse.

The male and female connectors 22 and 24 are connected respectively to the sleeve-like housings 20 by inserting said connectors respectively into the housings 20 from the inner ends 60 thereof until the curled clamping wings 34 of the female connector and the ears 30 of the male connector respectively engage the inner surfaces of the end walls 32 of the housings. When this occurs, the free ends of the flexible locking tongues 38 and 40 of the male and female connectors respectively will be registrable with the locking recess 42 and locking hole 44 of the respective housings 20, whereby said outer ends of the flexible tongues are received therein to prevent retrogressive movement of the connectors relative to the housings. Hence, an operable and relatively immovable connection is effected between the housings and the connectors of the circuit harness assemblies.

Some lateral play is afforded the connectors in the conductor ends of the molded housings, which results in slight transverse movability for self-alignment of the male and female connector terminals. This is accomplished through the use of chamfered edges of the male tab or connector which, when entering under the curled ears of the female connector, compensates for any dimensional inequality found on occasions in the molded frames of the abutting panels. This play is intentional because, though relative immovability is desired, there should not be absolute rigidity, which would cause jamming if misaligned.

Details of the basic structure of the exemplary panel board 10 illustrated in the drawings will now be given. Each panel comprises a preferably glass or suitable transparent ceramic sheet 62. The sheet 62 is supported by the horizontal flanges 64 of the side members of the rectangular frame 14. Such flanges are provided with recesses 66 which are readily shown in FIGURES 5 through 8 for purposes of receiving sealing material such as a suitable epoxy resin 68, said sealing resin also preferably extending around the perimeter of the base supporting sheet 62 due to the provision of adequate clearance between the inner surfaces of the side members of rectangular frame 14 and the perimeter of the base sheet 62 as clearly shown in FIGURES 5 through 8.

Referring now to FIGURE 13, wherein the scale used therein allows for illustration of details of the panel board 10 more easily, it will be seen that a conductive layer 70 is deposited upon the upper surface, for example, of glass base sheet 62. Said layer may be a suitable current-conductive material such as tin chloride or tin oxide, or a very thin layer or film of aluminum or gold. Disposed directly upon the upper surface of the layer 70 is a carrier layer 72 which is preferably either synthetic resin, commonly referred to as plastic, or a ceramic dielectric, uniformly impregnated with a phosphorous material, commonly referred to as phosphor, and capable of becoming luminescent upon the imposition of a current upon or through such carrier layer.

Disposed directly upon the upper surface of carrier layer 72 is another current conductive layer 74 which is similar to the layer 70. Said uppermost conductive layer 74 then is covered by a sealing layer 76 of suitable material, such as the epoxy resin material 76, which has a very strong bonding affinity for the base glass sheet 62 as well as the conductive layers 74, the molded housings 20 and the molded frames 10.

In order to establish suitable electric circuits with the current conductive layers 70 and 74, a bus bar formed from silver paste 78, for example, is applied to the lower conductive layer 70 in which event the bus bar 78 is masked when applying the carrier layer 72 and uppermost conductive layer 74 as well as the sealing layer 76. Hence, the small terminal 56 of the lead wire 54 which is connected to circuit harness assembly 80 readily is permanently secured to the bus bar 78 by any suitable conventional means such as soldering.

Further, in regard to establishing the desired circuitry, particularly in regard to connecting the second circuit harness assembly 82 to the panel board 10 as shown in FIGURE 12, another silver paste bus bar 84 is connected to the uppermost conductive layer 74 and is covered by the sealing layer 76 when applied, the small terminal 56 of the lead wire 54 of said second circuit harness assembly being affixed to the bus bar 84 by suitable means such as soldering. It will be understood that the conductor 26 of the harness assembly 80 and the conductor 26 of the harness assembly 82 respectively are either negative or positive, or vice versa, so as to constitute conductors of a complete electric circuit.

The bus bars 78 and 84 may be at any locations desirable for utilization; viz., at opposite corners as shown in FIGURE 12, in adjacent corners, or adjacent the same side but spaced apart. It is only necessary that one bus bar be connected with one main conductor and the other bus bar is connected with the other main conductor, via the lead wires. Also, a plurality of bus bars and/or such connections could be used, for example, in a very large panel, wherein several contacts might be desirable.

Prior to the application of the sealing layers 76 of epoxy resins to the composite panel boards 10, the circuit harness assemblies 80 and 82 are placed adjacent but preferably spaced from the upper surface of the conductive layer 74 so as to dispose the reduced ends 18 of the housings 20 within the slot-like openings 16 of the rectangular frames 14 of the panel boards, it being understood that the harness assemblies are fabricated to be of appropriate length to permit the installation of the harnesses according to the aforementioned description.

Further, and preferably, a number of apertured supporting members such as blocks of suitable material 86, formed from appropriate synthetic resin or plastic, are threaded upon the electric conductors 26 of the harness assemblies, prior to the attachment of at least one of the connectors to one end of the assemblies, whereupon the blocks 86 are spaced suitably along the conductors 26 so as to rest upon the uppermost conductive layer 74. Hence, when the sealing layer 76 is placed upon the conductive layer 74, it will bond with not only the housings 20 but also the blocks 86 so as to position the same effectively and integrally partially within the sealing layer 76 as shown in exemplary manner in FIGURE 13. The securing of the conductors 26 by means of the blocks 86 largely will serve to prevent accidental separation of the conductors from the composite panel boards when finally assembled. As seen in FIGURE 13, some of the sealing material 76 usually flows into the interior of housing 20 but, inasmuch as the same is of an insulating nature, no harm is done.

To aid in aligning the various panel boards 10 in longitudinal arrangement with each other, especially when supported by a suitable elongated means such as T-bars 12, the rectangular frames 14 preferably are provided with planar extensions 88 respectively extending from the horizontal flanges 64 of the side of the rectangular frame 14 from which the male connectors 22 project, thus affording at least a limited amount of protection for such projecting male connectors. The planar extensions 88 underlie the horizontal flanges 64 of an adjacent panel board, especially when the male connectors 22 of the one panel are inserted into the preferably chamfered openings 90, see FIGURE 8, of the opposite panel board for final engagement by the curled wings 34 of said opposite panel board which form sockets to receive the male connectors 22.

The adjacent side of the rectangular frame 14 of the opposite panel board 10 is provided with a shorter projection 92 which is complementary to the planar extension 88 in thickness in a direction transverse to the plane of the panel board 10 and is arranged to be abutted by the extension 88 when two of the panel boards are mounted in abutting relationship with each other and the male and female connectors thereof are operatively connected.

Figure 10:
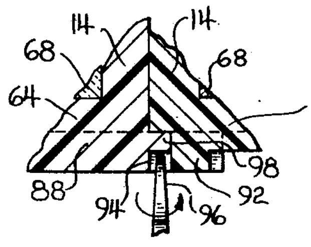
FIGURE 10 is an enlarged fragmentary detail of the connected panel boards illustrated in FIGURE 7 and shown in association with the tip end of a screw driver in position to be manipulated to separate said panel boards.
Figure 11:
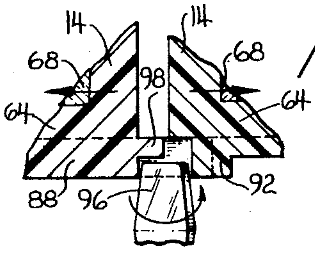
FIGURE 11 is a view similar to FIGURE 10 but illustrating the fragmentary portions of the two adjacent panel boards partially separated from each other as a result of manipulation of the screw driver.

The extensions 88 and projections 92 of the panel boards not only aid in aligning the panel boards with each other, but they also comprise means aiding in separating the panel boards from each other as, when for example, it is necessary to replace one of said panel boards with another one. Hence, by reference particularly to FIGURES 10 and 11, it will be seen that the extension 88 is provided with a shallow recess 94 of suitable dimension as readily to receive the bit 96 of a screw driver. Hence, when the screw driver bit 96 is inserted within the recess 94 and the bit is rotated in either direction, said bit will engage opposing walls of the recess 94 and projection 92 as clearly shown in FIGURES 10 and 11 for purposes of separating the panel boards. However, a safety measure is provided in the form of the extension 98, shown in said figures, which effectively prevents accidental movement of the screw driver bit 96 any further between the panel boards than is necessary, thereby preventing accidental injury of the panel boards or the hazard of electric shock through accidental contact with one of the projecting tabs during the separation operation.

While in FIGURE 1, for example, the panel boards 10 have been illustrated as being mounted horizontally as in a ceiling of a room for example, and are supported upon horizontal T-bars 12, it is to be understood that such panel boards may be mounted in any desired location and supported by any suitable or desired means, either horizontal, vertical, or otherwise, as required or desired. Also, although in the illustration shown in FIGURE 1, the panel boards 10 readily are suited for illumination purposes, such as by the same luminescing when a current is imposed upon or through the carrier layers 72 or other layers of such panel boards, said panel boards may be constructed to emit heat if desired, depending upon the nature of the carrier layer 72 for example.

Further, in the event it is desired not to use a transparent glass or other form of ceramic supporting sheet 62, and instead, a suitable metal such as, for example, steel or aluminum is employed, such metal sheet may be grounded for example by means of one of the harnesses, and it will then only be necessary to employ a single additional conductive layer so as to sandwich the carrier layer 72 between said supporting sheet and conductive layer, in which event the bus bars 78 or 84 are appropriately connected to the necessary conductive layers or sheets of the panel board, as required. The epoxy resin or other type of sealing layer 76 will be transparent when the panel board is for illuminating or luminescent purposes.

Although the housings 20 have been described and illustrated preferably as being unitary, they may be bipartite or otherwise, if desired, conceivably being connectable together by snap-type connectors which easily and inexpensively can be molded on the several parts to be connected. Even though formed from a plurality of parts, the housing still would have the essential inventive feature of receiving either a male or female terminal connector with equal facility and prevent relative longitudinal movement between the housing and connector by using appropriate locking lugs and detents and complementary recesses to receive the same, all within the spirit of the present invention.

While the invention has been described and illustrated in its preferred embodiments, and has included certain details, it should be understood that the invention is not to be limited to the precise details herein illustrated and described, since the same may be carried out in other ways falling within the scope of the invention as claimed.

We claim:

1. A composite circuit device comprising a pair of current conducting laminae having therebetween a carrier layer impregnated with a material capable of emitting radiant energy when an electric current is passed between said current conducting laminae and defining therewith a panel, circuit harness means affixed to said panel and electrically connected respectively to said current conducting laminae, said harness means being arranged for connection to current supply lines and having connectors at opposite ends respectively male and female and selectively inter-engageable with similar connectors on other similar panels and leads to supply lines, whereby a plurality of said circuit devices may be connected together by substantially abutting the same together edgewise, and similar insulating housings on said male and female connectors, said connectors respectively having different shapes of positioning means thereon and said housings having complementary means co-engaging said positioning means of said connectors to prevent relative separative movement therebetween regardless of whether a male or female connector is connected thereto.

2. A composite circuit device comprising a pair of current conducting laminae having therebetween a carrier layer impregnated with a material capable of emitting radiant energy when voltage is impressed across said laminae and defining therewith a panel, a pair of circuit harness elements affixed to said panel, each harness element including an insulated bus wire conductor having mating connector elements at the ends for tandem engagement with similar harness elements on adjacent circuit devices, tubular housings supporting and insulating said connector elements on said panel, the harness elements having lead wires electrically connecting the bus conductors with said laminae respectively.

3. A composite circuit device comprising a pair of current conducting laminae having therebetween a carrier layer impregnated with a material capable of emitting radiant energy when voltage is impressed across said laminae and defining therewith a panel, a pair of circuit harness elements affixed to said panel, each harness element including an insulated bus wire conductor having mating connector elements at the ends for tandem engagement with similar harness elements on adjacent circuit devices, tubular housings supporting and insulating said connector elements on said panel, the harness elements having lead wires electrically connecting the bus conductors with said laminae respectively, a frame enclosing the panel, the frame having openings along two opposite sides, each tubular housing presenting an open end to said openings respectively so that the connector elements of one circuit device can engage mating connector elements in adjacent and abutting circuit devices through alignment of the openings thereof.

4. A composite circuit device as set forth in claim 3 wherein said frame includes interlocking alignment means on said opposite sides, the alignment means of a pair of circuit devices brought together providing a recess for receiving a bladed tool effective by twisting to separate the circuit devices.

5. Circuit harness for connection to a composite panel comprising a conductor, a plug connector and a mating socket connector affixed to the opposite ends of the conductor for tandem engagement with similar circuit harnesses, a pair of similar generally tubular insulating housings, the connectors being slidably received and having snap-fit means engageable with similar abutment means in said housings, the socket connector being contained wholly within its housing and the plug connector being supported with a plug part projecting from its housing.

References Cited in the file of this patent

UNITED STATES PATENTS

| | | |
|---|---|---|
| 2,210,418 | Larson | Aug. 6, 1940 |
| 2,862,992 | Franz | Dec. 2, 1958 |
| 2,898,520 | Sterner | Aug. 4, 1959 |
| 2,919,361 | Tschakert | Dec. 29, 1959 |

FOREIGN PATENTS

| | | |
|---|---|---|
| 357,171 | Great Britain | Sept. 10, 1931 |